United States Patent
Park et al.

(10) Patent No.: US 9,340,100 B2
(45) Date of Patent: May 17, 2016

(54) POWER TRANSMISSION SYSTEM OF HYBRID ELECTRIC VEHICLE

(71) Applicant: Hyundai Motor Company, Seoul (KR)

(72) Inventors: Jongyun Park, Whasung-Si (KR); Sungik Bae, Whasung-Si (KR); Jae Young Choi, Whasung-Si (KR); Taewon Kim, Whasung-Si (KR); Wan Soo Kim, Whasung-Si (KR); Yeonho Kim, Whasung-Si (KR); Kyungha Kim, Whasung-Si (KR); Jin-sook Lee, Whasung-Si (KR); Min Sung Kim, Whasung-Si (KR); Won-Il Lee, Whasung-Si (KR); Shin Jong Kim, Whasung-Si (KR); Ki Nam Kim, Whasung-Si (KR); Eui-Cheol Chung, Whasung-Si (KR); Bung Chul Rim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/473,277

(22) Filed: Aug. 29, 2014

(65) Prior Publication Data
US 2015/0148189 A1    May 28, 2015

(30) Foreign Application Priority Data
Nov. 22, 2013   (KR) .................. 10-2013-0143258

(51) Int. Cl.
*B60K 6/442*     (2007.10)
*B60K 6/36*      (2007.10)
*F16H 3/08*      (2006.01)

(52) U.S. Cl.
CPC . *B60K 6/442* (2013.01); *B60K 6/36* (2013.01); *F16H 2003/0803* (2013.01); *Y10S 903/909* (2013.01); *Y10T 477/26* (2015.01)

(58) Field of Classification Search
None
See application file for complete search history.

(56) References Cited

U.S. PATENT DOCUMENTS

| | | | | |
|---|---|---|---|---|
| 2002/0189397 A1* | 12/2002 | Sakamoto | ............... | B60K 6/48 74/661 |
| 2003/0100395 A1* | 5/2003 | Hiraiwa | ............... | B60K 6/365 475/5 |
| 2010/0029436 A1* | 2/2010 | Katsuta | ............... | B60K 6/36 477/5 |
| 2011/0233020 A1* | 9/2011 | Tajima | ............... | B60K 6/387 192/48.8 |

FOREIGN PATENT DOCUMENTS

| | | | |
|---|---|---|---|
| JP | 2010-274881 A | 12/2010 | |
| JP | 2013-121788 A | 6/2013 | |
| KR | 10-0969983 B1 | 7/2010 | |
| KR | 10-1261955 B1 | 5/2013 | |

* cited by examiner

*Primary Examiner* — Mark Manley
(74) *Attorney, Agent, or Firm* — Morgan, Lewis & Bockius LLP

(57) ABSTRACT

A power transmission system of a hybrid electric vehicle may include, a generating device adapted to generate electricity by torque of an engine or to start the engine. an input device adapted to receive the torque of the engine. a speed output device changing the torque transmitted from the input device into two speed steps and outputting the changed torque. an auxiliary power source disposed between the input device and the speed output device and adapted to supply torque to the speed output device or to generate electricity by the torque of the speed output device. a final reduction device outputting the torque transmitted from the speed output device.

14 Claims, 7 Drawing Sheets

POWER TRANSMISSION SYSTEM OF HYBRID ELECTRIC VEHICLE

CROSS-REFERENCE TO RELATED APPLICATION

The present application claims priority to and the benefit of Korean Patent Application No. 10-2013-0143258 filed on Nov. 22, 2013, the entire contents of which is incorporated herein for all purposes by this reference.

BACKGROUND OF THE INVENTION

1. Field of the Invention

The present invention relates to a power transmission system of a hybrid electric vehicle. More particularly, the present invention relates to a power transmission system of a hybrid electric vehicle which minimizes power delivery loss and improves fuel economy by optimizing operation point of an engine.

2. Description of Related Art

Environmentally-friendly technique of vehicles is very important technique on which survival of future motor industry is dependent. Vehicle makers are focusing on development of environmentally-friendly vehicles to meet environment and fuel consumption regulations.

An electric vehicle (EV) and a fuel cell electric vehicle (FCEV) that are zero emission vehicles (ZEV) are developing as environmentally-friendly vehicles.

The electric vehicle and the fuel cell electric vehicle have merits of no emission, but have limitations, that is technical problems such as battery capacity, battery life, and so on, and construction of infrastructure such as charging stations.

Therefore, a hybrid electric vehicle using a conventional internal combustion engine and an electric motor has been developed and commercialized.

The hybrid electric vehicle is a vehicle driven by combination of electric power and power of the internal combustion engine. A typical hybrid electric vehicle uses a motor and a gasoline engine, and has high efficiency and can reduce exhaust gas efficiently by controlling power sources to be operated at a high-efficiency point of a system.

In addition, the hybrid electric vehicle does not demand additional charging stations but improves fuel economy and secures similar travel distance to a gasoline vehicle. Therefore, the hybrid electric vehicle will be mainly used as future environmentally-friendly vehicles.

Meanwhile, power flow of the hybrid electric vehicle includes mechanical power flow where power of the engine is directly transmitted to an output shaft using power split device such as planetary gear sets that distribute flow of power, and electric power flow where a generator generates electricity using the power of the engine and a battery is charged by the generated electricity or a motor is driven by energy of the charged battery.

A hybrid system of power split type can operate the engine independently from the output shaft, can turn on or off the engine freely during running, and can achieve an electric vehicle mode.

In addition, since the hybrid system can achieve an electrically variable transmission (EVT) using two motor/generators, the engine may be operated efficiently.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission system of a hybrid electric vehicle having advantages of achieving electric vehicle (EV) mode, series mode, and parallel mode by disposing a synchronizing unit on an output shaft and improving fuel economy by minimizing power delivery loss and optimizing operation point of an engine.

A power transmission system of a hybrid electric vehicle according to an exemplary embodiment of the present invention may include, a first input shaft adapted to receive torque of an engine. a second input shaft selectively connected to the first input shaft through a clutch and provided with at least one input gear fixedly disposed thereon. a first motor/generator adapted to supply or receive torque through an idle shaft operably connected to the first input shaft. an output shaft disposed in parallel with the second input shaft and provided with at least one speed gear rotatably disposed thereon and engaged with the at least one input gear on the second input shaft and an output gear fixedly disposed thereon. a synchronizing unit selectively connecting the at least one speed gear to the output shaft. a second motor/generator adapted to supply torque to the output shaft or receive torque from the output shaft, and. a final reduction device finally outputting the torque transmitted from the output gear on the output shaft.

A charging input gear may be fixedly disposed on the first input shaft and a charging output gear may be rotatably disposed on the first input shaft, wherein an idle input gear engaged with the charging input gear and an idle output gear engaged with the charging output gear are fixedly disposed on the idle shaft.

The first motor/generator may be operably connected to the charging output gear.

The second input shaft may be provided with a first input gear and a second input gear that are spaced from each other and are fixedly disposed on the second input shaft.

The output shaft may be provided with a first speed gear and a second speed gear rotatably disposed thereon, wherein the first speed gear is engaged with the first input gear and the second speed gear is engaged with the second input gear.

The synchronizing unit may be disposed between the first speed gear and the second speed gear and may selectively and operably connect the first speed gear or the second speed gear to the output shaft.

The second input shaft may be provided with a motor driving gear operably connected to the second motor/generator and rotatably disposed thereon, and the output shaft may be provided with a motor driven gear engaged with the motor driving gear and fixedly disposed thereon.

A power transmission system of a hybrid electric vehicle according to another exemplary embodiment of the present invention may include, a generating device adapted to generate electricity by torque of an engine or to start the engine. an input device adapted to receive the torque of the engine. a speed output device changing the torque transmitted from the input device into two speed steps and outputting the changed torque. an auxiliary power source disposed between the input device and the speed output device and adapted to supply torque to the speed output device or to generate electricity by the torque of the speed output device, and. a final reduction device outputting the torque transmitted from the speed output device.

The generating device may include, a first input shaft receiving the torque of the engine and provided with a charging input gear and a charging output gear. an idle shaft disposed in parallel with the first input shaft and provided with an idle input gear engaged with the charging input gear and an idle output gear engaged with the charging output gear, and. a first motor/generator operably connected to the charging output gear.

The charging input gear may be fixedly disposed on the first input shaft and the charging output gear may be rotatably disposed on the first input shaft.

The idle input gear and idle output gear may be fixedly disposed on the idle shaft.

The input device may include, a second input shaft selectively connected to the first input shaft. first and second input gears fixedly disposed on the second input shaft, and. a clutch disposed between the first input shaft and the second input shaft and adapted to selectively connect the first input shaft and the second input shaft.

The speed output device may include, an output shaft disposed in parallel with the second input shaft. first and the second speed gears rotatably disposed on the output shaft and engaged respectively with the first and second input gears. a synchronizing unit operably connecting the first speed gear or the second speed gear to the output shaft, and. an output gear fixedly disposed on the output shaft.

The synchronizing unit may be disposed on the output shaft between the first speed gear and the second speed gear.

The auxiliary power source may include a second motor/generator. a motor driving gear rotatably disposed on the second input shaft and operably connected to the second motor/generator, and. a motor driven gear engaged with the motor driving gear and fixedly disposed on the output shaft.

The first motor/generator and the second motor/generator may be electrically connected to a battery.

The final reduction device may include, a final reduction gear engaged with the output gear, and. a differential apparatus receiving and outputting torque of the final reduction gear.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
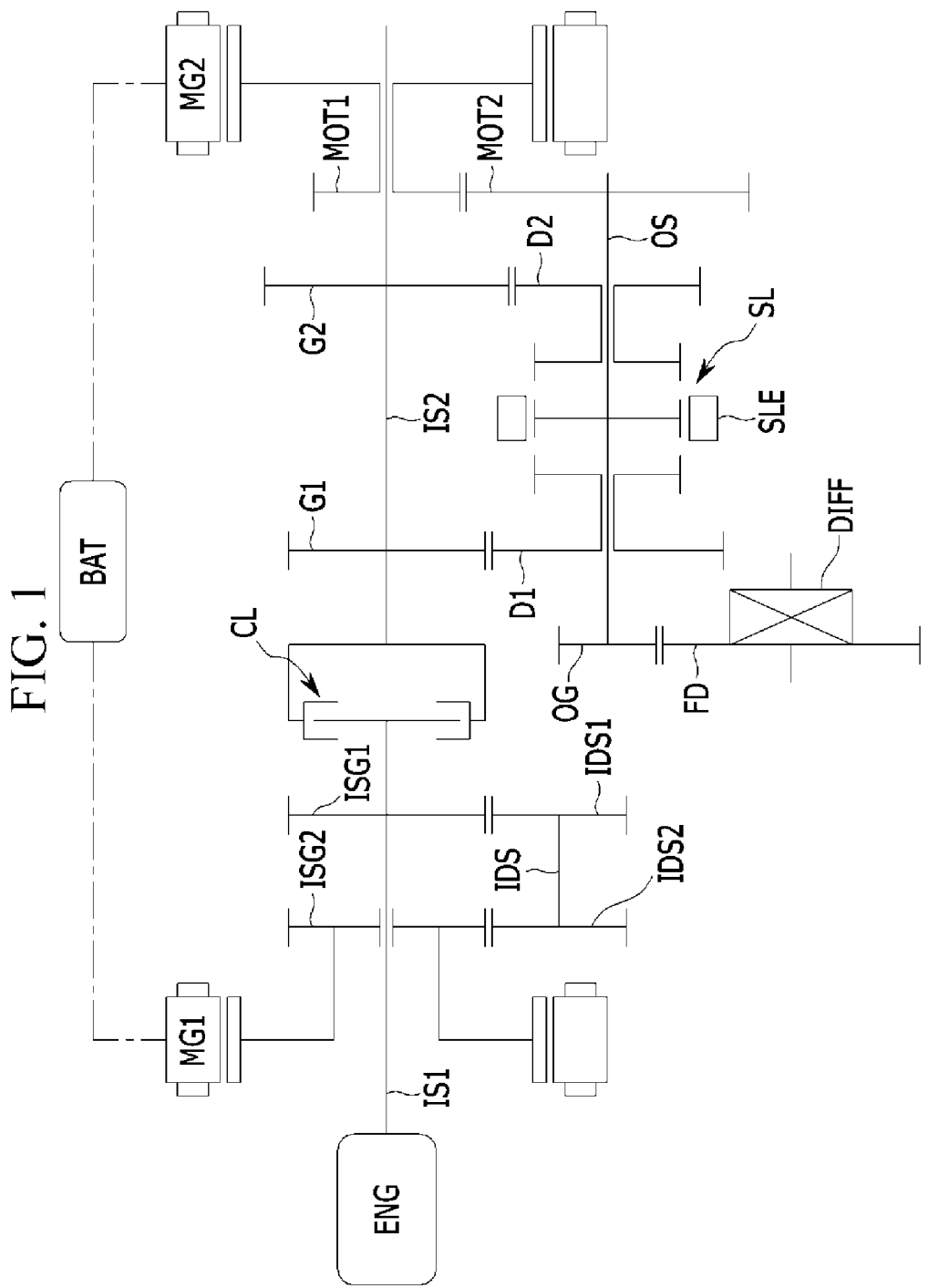
FIG. 1 is a schematic diagram of a power transmission system of a hybrid electric vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a power transmission system of a hybrid electric vehicle according to an exemplary embodiment of the present invention.

Referring to FIG. 1, a power transmission system of a hybrid electric vehicle according to an exemplary embodiment of the present invention includes first and second input shafts IS1 and IS2, first and second motor/generators MG1 and MG2, an output shaft OS, a synchronizing unit, and a final reduction device.

An engine ENG using fossil fuel may be applied as main power source of the hybrid electric vehicle.

The first input shaft IS1 transmits torque of the engine ENG to the first motor/generator MG1 through an idle shaft IDS, and thereby the first motor/generator MG1 is operated as a generator.

The first input shaft IS1 directly receives the torque of the engine ENG and is provides with a charging input gear ISG1 and a charging output gear ISG2 disposed thereon.

The charging input gear ISG1 is fixedly disposed on the first input shaft IS1 and the charging output gear ISG2 is rotatably disposed on the first input shaft IS1.

In addition, the idle shaft IDS is disposed in parallel with and apart from the first input shaft IS1.

An idle input gear IDS1 and an idle output gear IDS2 are fixedly disposed on the idle shaft IDS. The idle input gear IDS1 is engaged with the charging input gear ISG1 and the idle output gear IDS2 is engaged with the charging output gear ISG2.

In addition, the first motor/generator MG1 is directly connected to the charging output gear ISG2 and is operated as a motor or a generator.

If the engine ENG operates, the torque of the engine ENG is transmitted to the first motor/generator MG1 through the first input shaft IS1, the charging input gear ISG1, the idle input gear IDS1, the idle shaft IDS, the idle output gear IDS2, and the charging output gear ISG2. Therefore, the first motor/generator MG1 can generate electricity. A battery BAT is charged by using the generated energy.

At this time, since the torque of the engine ENG is transmitted to the first motor/generator MG1 through a plurality of gears engaged with each other, charging efficiency may be improved by adjusting gear ratios of the gears.

In addition, first and second input gears G1 and G2 are fixedly disposed on the second input shaft IS2.

The second input shaft IS2 is disposed at the rear of the first input shaft IS1 and a clutch CL is interposed between the first input shaft IS1 and the second input shaft IS2. The clutch CL selectively connects the first and second input shafts IS1 and IS2.

That is, when the clutch CL is engaged, the first input shaft IS1 and the second input shaft IS2 are operably connected to each other.

The clutch CL may be a conventional multi-plate friction element of wet type that is operated by hydraulic pressure and may be controlled by a hydraulic control system.

First and the second speed gears D1 and D2, the synchronizing unit, and an output gear OG are disposed on the output shaft OS.

The output shaft OS is disposed in parallel with and apart from the second input shaft IS2.

The first speed gear D1 and the second speed gear D2 are rotatably disposed on the output shaft OS, the first speed gear D1 is engaged with the first input gear G1, and the second speed gear D2 is engaged with the second input gear G2.

In addition, the synchronizing unit includes a synchronizer SL, is disposed between the first speed gear D1 and the second speed gear D2 on the output shaft OS, selectively and operably connects the first speed gear D1 or the second speed gear D2 to the output shaft OS.

Since the synchronizer SL is well known to a person of an ordinary skill in the art, detailed description thereof will be omitted. A sleeve SLE used in the synchronizer SL can move in an axial direction by an additional actuator, and the actuator may be controlled by a transmission control unit.

In addition, the output gear OG is fixedly disposed on an end portion of the output shaft OS and transmits torque of the output shaft OS to the final reduction device.

In addition, the second motor/generator MG2 includes a motor driving gear MOT1 and a motor driven gear MOT2.

The second motor/generator MG2 is an auxiliary power source, is disposed on the second input shaft IS2, and is operated as a motor or a generator.

The motor driving gear MOT1 is rotatably disposed on the second input shaft IS2 and is directly connected to the second motor/generator MG2. The motor driven gear MOT2 is fixedly disposed on the other end portion of the output shaft OS and is engaged with the motor driving gear MOT1.

Therefore, when the second motor/generator MG2 is operated, torque of the second motor/generator MG2 is output through the motor driving gear MOT1, the motor driven gear MOT2, the output shaft OS, and the output gear OG.

In addition, the final reduction device includes a differential apparatus DIFF and a final reduction gear FD. The final reduction gear FD is engaged with the output gear OG, decelerates the torque output from the output shaft OS, and transmits the decelerated torque to a driving wheel through the differential apparatus DIFF.

Figure 2:
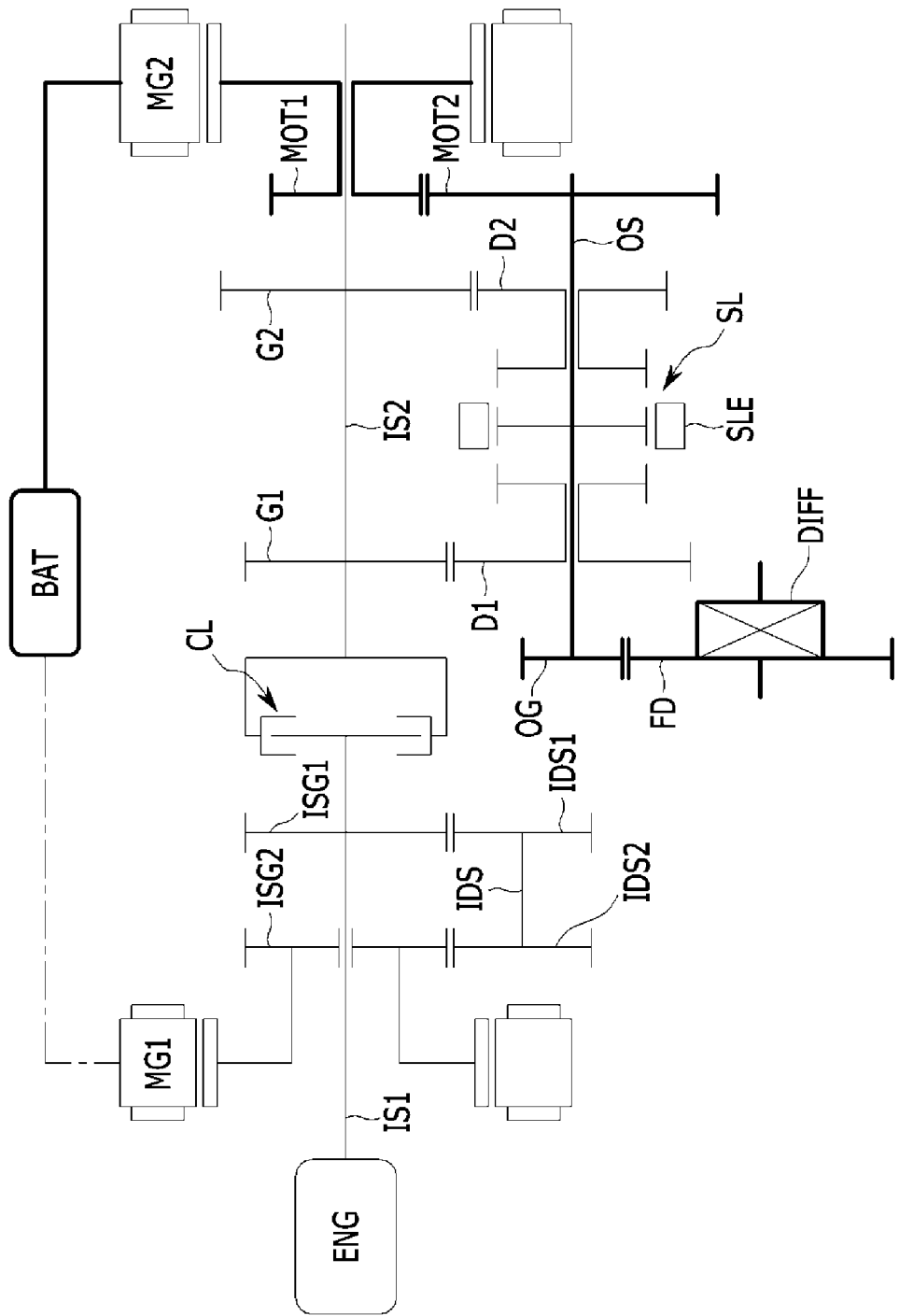
FIG. 2 is a schematic diagram illustrating power delivery path of a power transmission system according to an exemplary embodiment of the present invention at an electric vehicle (EV) mode.

FIG. 2 is a schematic diagram illustrating power delivery path of a power transmission system according to an exemplary embodiment of the present invention at an electric vehicle (EV) mode.

Referring to FIG. 2, a vehicle runs by using the torque of the second motor/generator MG2 that is operated by electrical energy of the battery BAT at an EV mode.

That is, the second motor/generator MG2 is operated by the electrical energy received from the battery BAT and the torque of the second motor/generator MG2 is transmitted to the final reduction gear FD through the motor driving gear MOT1, the motor driven gear MOT2, the output shaft OS, and the output gear OG at a low-speed region. Therefore, the vehicle runs at the EV mode.

Figure 3:
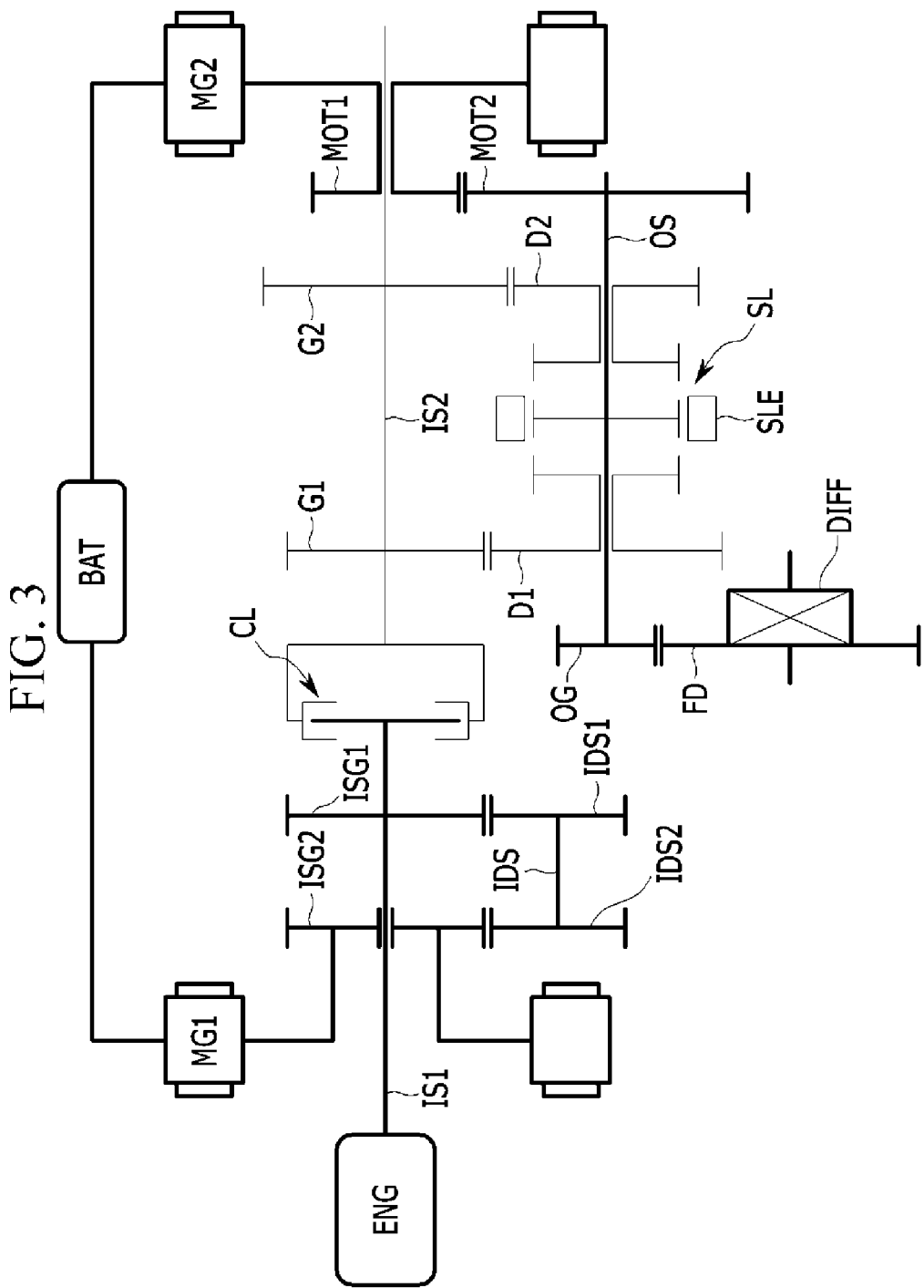
FIG. 3 is a schematic diagram illustrating power delivery path of a power transmission system according to an exemplary embodiment of the present invention at a series mode.

FIG. 3 is a schematic diagram illustrating power delivery path of a power transmission system according to an exemplary embodiment of the present invention at a series mode.

Referring to FIG. 3, the first motor/generator MG1 generates electricity by the torque of the engine ENG and the vehicle runs by using the torque of the second motor/generator MG2 that is operated by the electrical energy of the battery BAT at a series mode.

Therefore, the torque of the second motor/generator MG2 is transmitted to the final reduction gear FD through the motor driving gear MOT1, the motor driven gear MOT2, the output shaft OS, and the output gear OG. Therefore, the vehicle runs at the series mode.

At this time, the engine ENG is started by the first motor/generator MG1, the torque of the engine ENG is transmitted to the first motor/generator MG1 through the first input shaft IS1, the charging input gear ISG1, the idle input gear IDS1, the idle shaft IDS, the idle output gear IDS2, and the charging output gear ISG2, and the first motor/generator MG1 generates electricity. Therefore, the battery BAT is charged by the electricity generated by the first motor/generator MG1.

Figure 4:
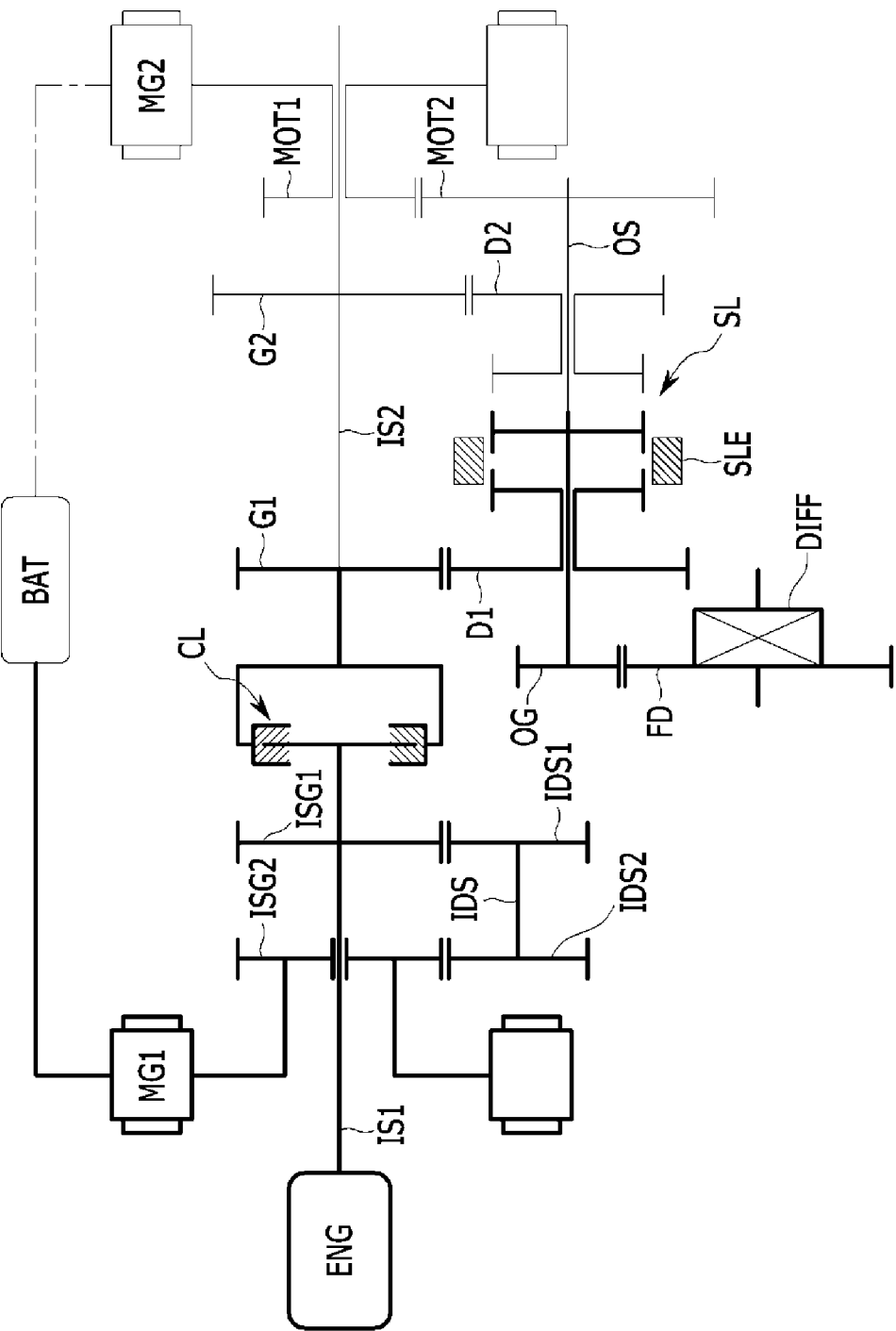
FIG. 4 is a schematic diagram illustrating power delivery path of a power transmission system according to an exemplary embodiment of the present invention at a first engine mode.

FIG. 4 is a schematic diagram illustrating power delivery path of a power transmission system according to an exemplary embodiment of the present invention at a first engine mode.

Referring to FIG. 4, the second motor/generator MG2 is not operated and the vehicle runs by using the torque of the engine ENG at a first engine mode.

That is, the engine ENG is started by the first motor/generator MG1, the sleeve SLE of the synchronizer SL operably connects the first speed gear D1 with the output shaft OS, and the clutch CL is engaged.

In this case, the torque of the engine ENG is transmitted to the final reduction gear FD through the first input shaft IS1, the clutch CL, the second input shaft IS2, the first input gear G1, the first speed gear D1, the output shaft OS, and the output gear OG. Therefore, the vehicle runs at the first engine mode.

At this time, the torque of the engine ENG is transmitted to the first motor/generator MG1 and the first motor/generator MG1 generates electricity to charge the battery BAT.

Figure 5:
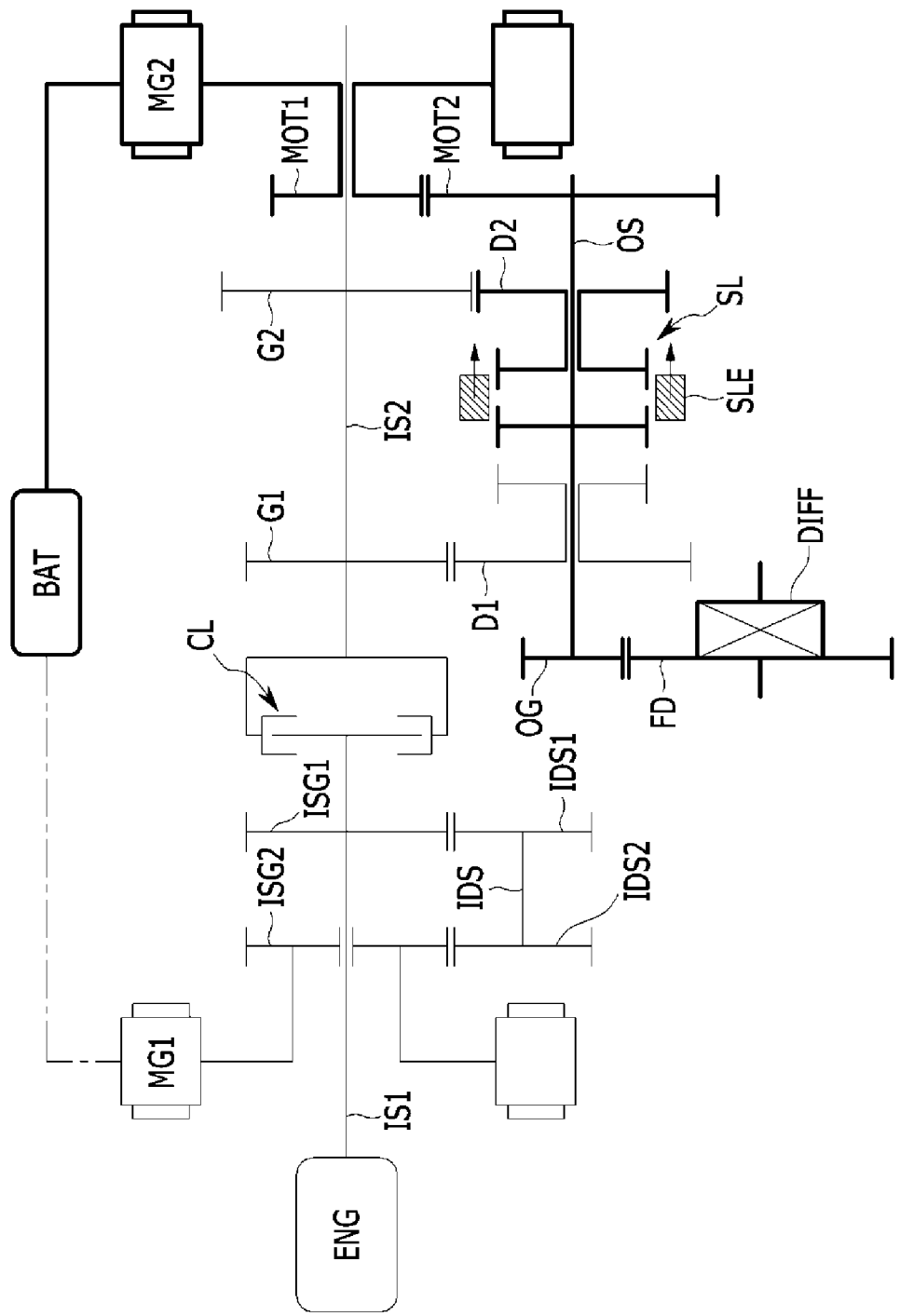
FIG. 5 is a schematic diagram illustrating power delivery path of a power transmission system according to an exemplary embodiment of the present invention during mode change from a first engine mode into a second engine mode.

FIG. 5 is a schematic diagram illustrating power delivery path of a power transmission system according to an exemplary embodiment of the present invention during mode change from a first engine mode into a second engine mode.

Referring to FIG. 5, when the vehicle speed increases at the first engine mode and a mode is changed to a second engine mode, the engine ENG stops for a while and the clutch CL is released. At this time, the second motor/generator MG2 is controlled to be operated.

Therefore, the vehicle runs by the second motor/generator MG2 during mode change, and the sleeve SLE of the synchronizer SL is released from the first speed gear D1 and is engaged with the second speed gear D2.

Figure 6:
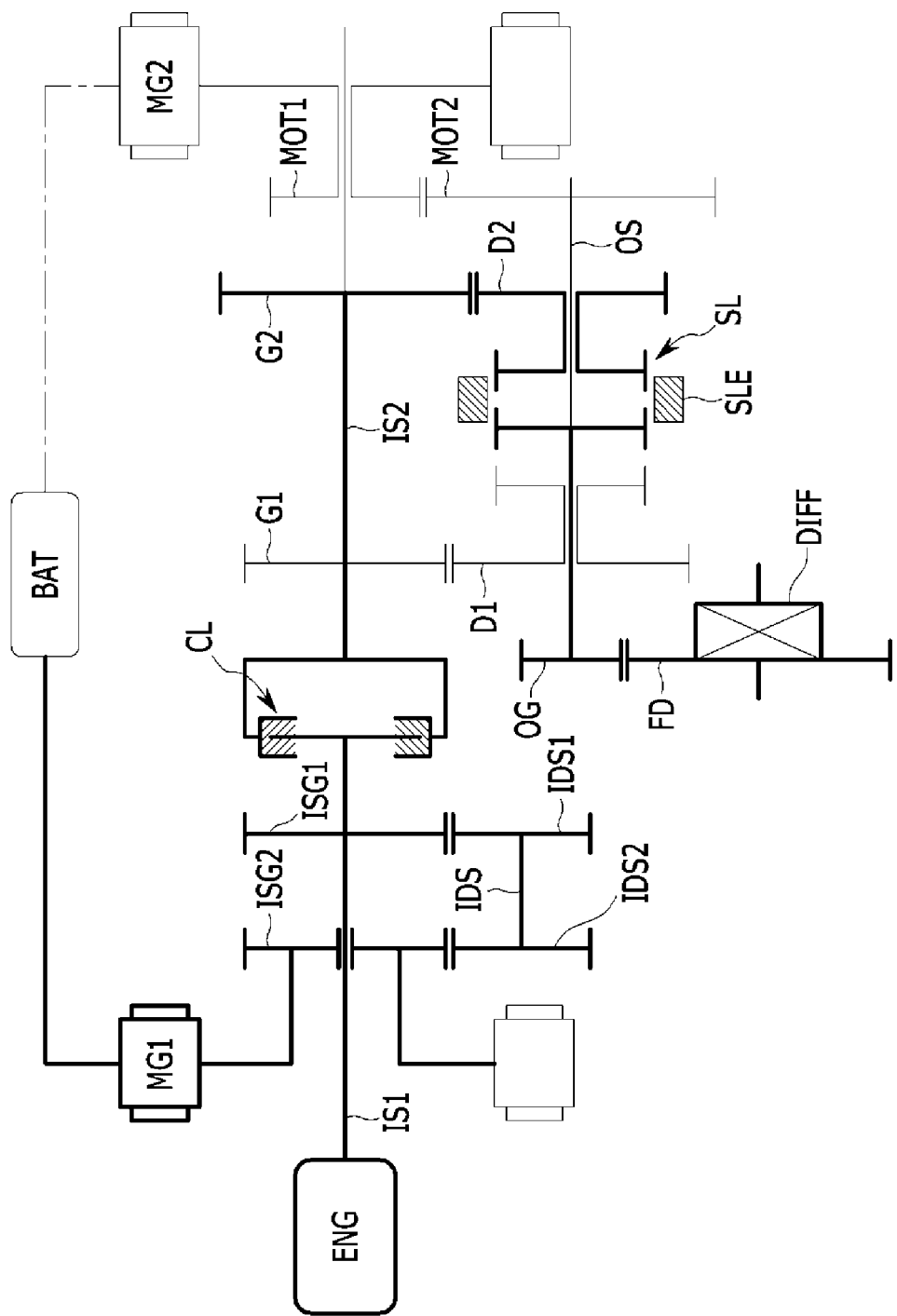
FIG. 6 is a schematic diagram illustrating power delivery path of a power transmission system according to an exemplary embodiment of the present invention at a second engine mode.

FIG. 6 is a schematic diagram illustrating power delivery path of a power transmission system according to an exemplary embodiment of the present invention at a second engine mode.

Referring to FIG. 6, the sleeve SLE of the synchronizer SL is engaged with the second speed gear D2 again at the second engine mode. At this time, the first motor/generator MG1 starts the engine ENG and the second motor/generator MG2 is stopped during control of the clutch CL.

In this case, the torque of the engine ENG is transmitted to the final reduction gear FD through the first input shaft IS1, the clutch CL, the second input shaft IS2, the second input gear G2, the second speed gear D2, the output shaft OS, and the output gear OG. Therefore, the vehicle runs at the second engine mode.

Figure 7:
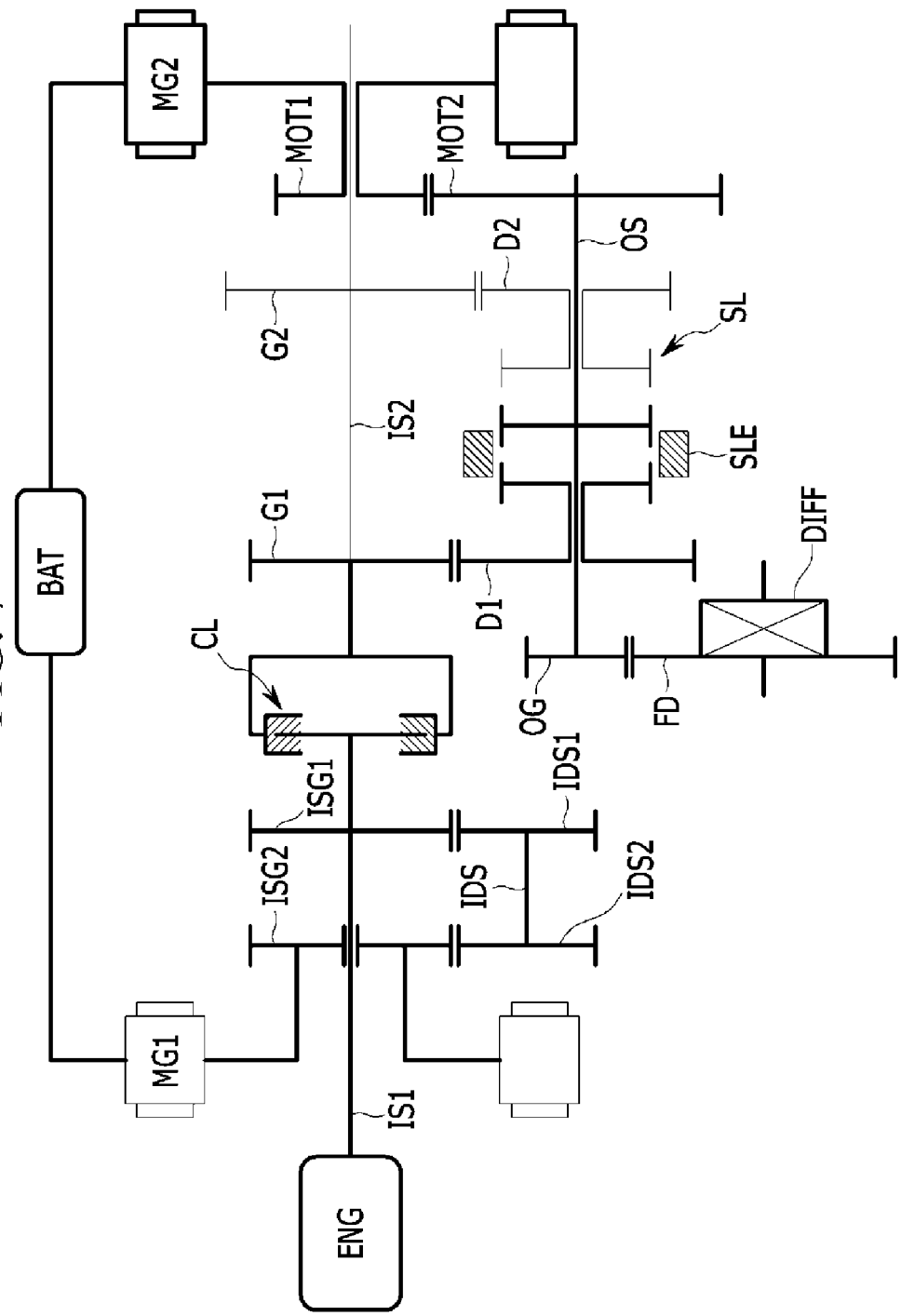
FIG. 7 is a schematic diagram illustrating power delivery path of a power transmission system according to an exemplary embodiment of the present invention at an engine/motor operation mode.

FIG. 7 is a schematic diagram illustrating power delivery path of a power transmission system according to an exemplary embodiment of the present invention at an engine/motor operation mode.

Referring to FIG. 7, the engine ENG is operated as a main power source and the second motor/generator MG2 is operated as an auxiliary power source at an engine/motor operation mode.

That is, the torque of the engine ENG is transmitted to the output shaft OS through the same path as the first engine mode, and the torque of the second motor/generator MG2 is transmitted to the output shaft OS through the same path as at the EV mode. The vehicle can runs with high driving torque by the torque of the engine ENG and the torque of the second motor/generator MG2 at the engine/motor operation mode.

In addition, the torque of the engine ENG is transmitted to the first motor/generator MG1 and the first motor/generator MG1 can generate electricity. In addition, the electrical energy generated by the first motor/generator MG1 is used to charge the battery BAT.

It is illustrated in FIG. 7 but is not limited that the sleeve SLE of the synchronizer SL operably connects the first speed gear D1 and the output shaft OS. That is, the sleeve SLE of the synchronizer SL can operably connect the second speed gear D2 and the output shaft OS.

An exemplary embodiment of the present invention may improve fuel economy by achieving various modes as a consequence of disposing a synchronizer on an output shaft.

In addition, since an engine operates at an optimum operation point at a series mode, charging efficiency of the battery may be improved and fuel economy may be enhanced.

Since torque of an engine is transmitted to a first motor/generator through a plurality of gears, charging efficiency may be optimized by adjusting gear ratios of the gears.

Since a clutch is disposed between a first input shaft and a second input shaft, torque of an engine is not transmitted but a vehicle is driven by a second motor/generator during mode change from a first engine mode to a second engine mode. Therefore, torque may be continuously supplied to the vehicle during the mode change.

In addition, a layout may be simple, packageability may be improved, and weight and cost may be reduced, compared with an automatic transmission including planetary gears, clutches, and brakes.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A power transmission system of a hybrid electric vehicle comprising:
    a first input shaft adapted to receive torque of an engine;
    a second input shaft selectively connected to the first input shaft through a clutch and provided with at least one input gear fixedly disposed thereon;
    a first motor/generator adapted to supply or receive torque through an idle shaft operably connected to the first input shaft;
    an output shaft disposed in parallel with the second input shaft and provided with at least one speed gear rotatably disposed thereon and engaged with the at least one input gear on the second input shaft and an output gear fixedly disposed thereon;
    a synchronizing unit selectively connecting the at least one speed gear to the output shaft;
    a second motor/generator adapted to supply torque to the output shaft or receive torque from the output shaft; and
    a final reduction device finally outputting the torque transmitted from the output gear on the output shaft,
    wherein a charging input gear is fixedly disposed on the first input shaft and a charging output gear is rotatably disposed on the first input shaft, and
    wherein an idle input gear engaged with the charging input gear and an idle output gear engaged with the charging output gear are fixedly disposed on the idle shaft.

2. The power transmission system of claim 1, wherein the first motor/generator is operably connected to the charging output gear.

3. The power transmission system of claim 1, wherein the second input shaft is provided with a first input gear and a second input gear that are spaced from each other and are fixedly disposed on the second input shaft.

4. The power transmission system of claim 3,
    wherein the output shaft is provided with a first speed gear and a second speed gear rotatably disposed thereon, and
    wherein the first speed gear is engaged with the first input gear and the second speed gear is engaged with the second input gear.

5. The power transmission system of claim 4, wherein the synchronizing unit is disposed between the first speed gear and the second speed gear and selectively and operably connects the first speed gear or the second speed gear to the output shaft.

6. The power transmission system of claim 1, wherein the second input shaft is provided with a motor driving gear operably connected to the second motor/generator and rotatably disposed on the second input shaft, and the output shaft is provided with a motor driven gear engaged with the motor driving gear and fixedly disposed on the output shaft.

7. A power transmission system of a hybrid electric vehicle comprising: a generating device adapted to generate electricity by torque of an engine or to start the engine; an input device adapted to receive the torque of the engine;
- a speed output device changing the torque transmitted from the input device into two speed steps and outputting the changed torque;
- an auxiliary power source disposed between the input device and the speed output device and adapted to supply torque to the speed output device or to generate electricity by the torque of the speed output device; and
- a final reduction device outputting the torque transmitted from the speed output devices
- wherein the generating device comprises:
- a first input shaft receiving the torque of the engine and provided with a charging input gear and a charging output gear;
- an idle shaft disposed in parallel with the first input shaft and provided with an idle input gear engaged with the charging input gear and an idle output gear engaged with the charging output gear; and a first motor/generator operably connected to the charging output gear;
- wherein the idle input gear and the idle output gear are fixedly disposed on the idle shaft.

8. The power transmission system of claim 7, wherein the charging input gear is fixedly disposed on the first input shaft and the charging output gear is rotatably disposed on the first input shaft.

9. The power transmission system of claim 7, wherein the input device comprises:
- a second input shaft selectively connected to the first input shaft;
- first and second input gears fixedly disposed on the second input shaft; and
- a clutch disposed between the first input shaft and the second input shaft and adapted to selectively connect the first input shaft and the second input shaft.

10. The power transmission system of claim 9, wherein the speed output device comprises:
- an output shaft disposed in parallel with the second input shaft;
- first and second speed gears rotatably disposed on the output shaft and engaged respectively with the first and second input gears;
- a synchronizing unit operably connecting the first speed gear or the second speed gear to the output shaft; and
- an output gear fixedly disposed on the output shaft.

11. The power transmission system of claim 10, wherein the synchronizing unit is disposed on the output shaft between the first speed gear and the second speed gear.

12. The power transmission system of claim 10, wherein the auxiliary power source comprises:
- a second motor/generator;
- a motor driving gear rotatably disposed on the second input shaft and operably connected to the second motor/generator; and
- a motor driven gear engaged with the motor driving gear and fixedly disposed on the output shaft.

13. The power transmission system of claim 12, wherein the first motor/generator and the second motor/generator are electrically connected to a battery.

14. The power transmission system of claim 10, wherein the final reduction device comprises:
- a final reduction gear engaged with the output gear; and
- a differential apparatus receiving and outputting torque of the final reduction gear.

* * * * *